United States Patent
Lim et al.

(10) Patent No.: US 12,257,912 B2
(45) Date of Patent: Mar. 25, 2025

(54) ELECTRIC MOBILITY VEHICLE

(71) Applicants: HYUNDAI MOTOR COMPANY, Seoul (KR); KIA CORPORATION, Seoul (KR)

(72) Inventors: Jun Young Lim, Incheon (KR); Seon Il Yoon, Yeoju-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 336 days.

(21) Appl. No.: 17/864,735

(22) Filed: Jul. 14, 2022

(65) Prior Publication Data

US 2023/0202313 A1    Jun. 29, 2023

(30) Foreign Application Priority Data

Dec. 28, 2021 (KR) .......................... 10-2021-0190027

(51) Int. Cl.
*B60L 50/64* (2019.01)
*B60K 1/04* (2019.01)
*B60L 58/26* (2019.01)

(52) U.S. Cl.
CPC ............ *B60L 50/64* (2019.02); *B60K 1/04* (2013.01); *B60L 58/26* (2019.02); *B60K 2001/0438* (2013.01)

(58) Field of Classification Search
CPC .... B60K 2001/0146; B60K 2001/0433; B60K 2001/0438
See application file for complete search history.

(56) References Cited

U.S. PATENT DOCUMENTS

| | | | |
|---|---|---|---|
| 7,556,100 B2 | 7/2009 | Steiner | |
| 7,654,351 B2* | 2/2010 | Koike | H01M 50/278 180/68.5 |
| 8,186,468 B2* | 5/2012 | Parrett | B60L 1/003 903/952 |
| 8,372,530 B2* | 2/2013 | Kubota | H01M 50/24 429/185 |
| 8,556,017 B2* | 10/2013 | Kubota | H01M 10/643 180/68.5 |
| 8,567,543 B2* | 10/2013 | Kubota | B60L 58/26 180/68.5 |
| 9,054,399 B2* | 6/2015 | Mishima | B60L 58/26 |
| 9,302,573 B2* | 4/2016 | Janarthanam | B60L 58/26 |
| 9,616,765 B2* | 4/2017 | Yamatani | H01M 10/6563 |
| 9,623,741 B2* | 4/2017 | Honda | H01M 10/6566 |
| 9,849,768 B2* | 12/2017 | Hayashi | B62D 25/20 |
| 9,884,535 B2* | 2/2018 | Nakano | B60K 1/04 |

(Continued)

FOREIGN PATENT DOCUMENTS

| | | |
|---|---|---|
| CN | 208993784 U | 6/2019 |
| JP | H07156826 A | 6/1995 |

(Continued)

*Primary Examiner* — Jeffrey J Restifo
(74) *Attorney, Agent, or Firm* — Lempia Summerfield Katz LLC (57) ABSTRACT

Proposed is an electric mobility vehicle in which material cost is reduced by simplifying the structure for cooling a battery module and a sealing structure. The electric mobility vehicle is capable of increasing sealing performance since an inflow path of moisture from outside is reduced, and securing desired battery cooling performance.

10 Claims, 10 Drawing Sheets

(56) References Cited

U.S. PATENT DOCUMENTS

| | | | |
|---|---|---|---|
| 9,893,395 B2* | 2/2018 | Tsuchiya | H01M 50/249 |
| 10,118,459 B2* | 11/2018 | Yasuda | B60L 50/64 |
| 10,189,343 B2* | 1/2019 | Ogawa | B60K 1/04 |
| 10,326,183 B2* | 6/2019 | Yasuda | H01M 10/6563 |
| 10,343,548 B2* | 7/2019 | Yokoyama | B60L 50/66 |
| 10,381,620 B2* | 8/2019 | Takahashi | H01M 10/66 |
| 10,399,455 B2* | 9/2019 | Sugitate | H01M 10/615 |
| 10,418,675 B2* | 9/2019 | Katsuno | H01M 10/613 |
| 11,192,445 B2* | 12/2021 | Kano | B60K 1/04 |
| 11,312,205 B2* | 4/2022 | Aoki | B60K 11/06 |
| 11,760,185 B2* | 9/2023 | Komatsu | B60L 58/26 454/144 |
| 11,858,364 B2* | 1/2024 | Lim | B60L 50/66 |
| 11,897,542 B2* | 2/2024 | Nakano | B62D 21/15 |
| 11,990,596 B2* | 5/2024 | Kimura | H01M 10/46 |
| 2012/0138260 A1* | 6/2012 | Lee | H01M 10/6556 165/41 |
| 2014/0262573 A1* | 9/2014 | Ito | B60K 1/04 180/68.5 |
| 2016/0301120 A1* | 10/2016 | Katsuno | H01M 10/625 |
| 2017/0267058 A1* | 9/2017 | Koyama | B60N 2/015 |
| 2018/0015806 A1* | 1/2018 | Yasuda | B60L 58/26 |
| 2018/0050606 A1* | 2/2018 | Sugitate | B60K 11/06 |
| 2018/0345759 A1* | 12/2018 | Okumura | B60K 11/06 |
| 2021/0178882 A1* | 6/2021 | Kim | B60K 1/04 |
| 2021/0257694 A1* | 8/2021 | Kim | B60L 50/64 |
| 2022/0320630 A1* | 10/2022 | Kono | H01M 10/6563 |
| 2023/0178835 A1* | 6/2023 | Lim | H01M 50/262 429/7 |
| 2023/0202281 A1* | 6/2023 | Lim | B60L 50/66 180/291 |
| 2023/0202313 A1* | 6/2023 | Lim | B60L 58/26 180/68.5 |
| 2023/0249583 A1* | 8/2023 | Yu | B60L 50/66 180/68.5 |
| 2023/0264564 A1* | 8/2023 | Murata | B60K 11/06 454/184 |
| 2023/0318110 A1* | 10/2023 | Shinoda | B60K 1/04 429/82 |
| 2024/0120575 A1* | 4/2024 | Inagaki | H01M 10/625 |
| 2024/0234865 A1* | 7/2024 | Komatsu | H01M 10/6566 |

FOREIGN PATENT DOCUMENTS

| | | |
|---|---|---|
| JP | 2010126015 A | 6/2010 |
| JP | 2015101322 A | 6/2015 |
| JP | 2016115446 A | 6/2016 |
| KR | 20120094697 A | 8/2012 |
| KR | 20200104682 A | 9/2020 |
| KR | 20230086854 A | 6/2023 |
| KR | 20230098432 A | 7/2023 |

* cited by examiner

ELECTRIC MOBILITY VEHICLE

CROSS REFERENCE TO RELATED APPLICATION

This application claims priority to and the benefit of Korean Patent Application No. 10-2021-0190027, filed Dec. 28, 2021, the entire contents of which are incorporated herein by reference.

BACKGROUND

Field

The present disclosure relates to an electric mobility vehicle. More particularly, the present disclosure relates to an electric mobility vehicle in which a battery module is provided for a fuel cell.

Description of the Related Art

Recently, due to environmental problems, high oil prices, and so on, interest in environmentally friendly vehicles is increasing. Thus, various electric vehicles that are driven using electric energy have been developed.

As electric vehicles (EV), a battery powered EV, a fuel cell EV that uses a fuel cell to power a motor, a hybrid EV that uses both a motor and an engine, and so on have been developed.

Particularly, the electric vehicle is provided with a battery module for storing electric energy. Further, in the battery module, a plurality of battery cell units is accommodated in a battery casing. Since such a battery casing is large in volume and weight, it is important to secure a mounting space in a vehicle body so as to mount the battery casing on the vehicle body. In addition, as the battery module generates high temperature heat during driving, it is required to cool the battery module. However, the conventional battery casing is not optimally designed for the mounting space of the vehicle body and the cooling of the battery module.

The foregoing is intended merely to aid in the understanding of the background of the present disclosure, and is not intended to mean that the present disclosure falls within the purview of the related art that is already known to those having ordinary skill in the art.

SUMMARY OF THE PRESENT DISCLOSURE

The present disclosure provides an electric mobility vehicle in which a battery module is provided since a fuel cell is mounted. The electric mobility vehicle can reduce material cost by simplifying the structure for cooling the battery module, and the electric mobility vehicle is capable of securing desired battery cooling performance and battery sealing performance.

In one aspect of the present disclosure, an electric mobility vehicle includes: a vehicle body floor in which an opening hole is formed in a vertical direction; and a battery assembly in which a battery module is mounted. In particular, the battery assembly is provided with an inlet duct in which air is intaken and an outlet duct from which the air is discharged, and the battery assembly is configured such that the inlet duct is positioned at an upper portion of the vehicle body floor by passing through the opening hole when the battery assembly is mounted on a lower side of the vehicle body floor.

The battery assembly may be provided with a sealing body that is provided along a periphery of the inlet duct, and the sealing body may be pressed by a lower surface of the vehicle body floor. The battery assembly may be sealed when the battery assembly is coupled to the lower side of the vehicle body floor.

The battery module may include a high voltage battery electrically connected to a motor and a fuel cell stack and may further include a low voltage battery configured to supply electricity to an electric component. And the inlet duct may be mounted on the high voltage battery such that the high voltage battery is cooled by the air that is intaken.

The battery assembly may include an upper casing and a lower casing, and may be mounted inside the upper casing and the lower casing that are coupled together. In one form, a through-hole may be formed in the upper casing such that the inlet duct penetrates through the through-hole and is exposed to an outside.

The battery assembly may be provided with a first sealing body that is provided along a periphery of the inlet duct, and the first sealing body may be pressed by the upper casing when the upper casing and the lower casing are coupled together.

The inlet duct may be coupled to an upper surface of the high voltage battery, and a step may be formed along the periphery of the inlet duct, so that the first sealing body may be provided on the step.

The upper casing may be provided with a second sealing body that is provided along a periphery of the through-hole, and the second sealing body may be pressed by a lower surface of the vehicle body floor when the battery assembly is coupled to the lower side of the vehicle body floor.

The first sealing body and the second sealing body may be configured such that a pressure acting on the first sealing body and a pressure acting on the second sealing body from a space between the upper casing and the vehicle body floor may be uniformly formed when the upper casing and the lower casing are coupled together.

The lower casing may be provided with a plurality of coupling brackets that is provided along a border of the lower casing such that the plurality of coupling brackets may be coupled to each member from the lower side of the vehicle body floor.

The lower casing may be provided with a support frame that surrounds the lower casing, and the support frame may be coupled to the member of the vehicle body floor.

The vehicle body floor may be configured such that a peripheral portion of the opening hole forms a plane.

In the electric mobility vehicle configured as described above, the material cost is reduced by simplifying the structure for cooling the battery module and a sealing structure, the sealing performance is increased since an inflow path of moisture from the outside is reduced, and the desired battery cooling performance is secured.

BRIEF DESCRIPTION OF THE DRAWINGS

The above and other objectives, features, and other advantages of the present disclosure should be more clearly understood from the following detailed description when taken in conjunction with the accompanying drawings, in which.

The drawings described herein are for illustration purposes only and are not intended to limit the scope of the present disclosure in any way.

DETAILED DESCRIPTION

Hereinafter, an electric mobility vehicle according to an embodiment of the present disclosure is described with reference to accompanying drawings.

Specific structural or functional descriptions of the embodiments of the present disclosure are exemplified only for the purpose of describing the embodiments according to the present disclosure, and the embodiments may be implemented in various forms, and should not be construed as being limited to the embodiments described in the present disclosure.

Since the embodiments according to the present disclosure can be modified in various ways and have various forms, specific embodiments are illustrated in the drawings and described in detail in the present disclosure. However, this is not intended to limit the embodiments according to the concept of the present disclosure to a specific form of disclosure, and it should be understood that all changes, equivalents, and substitutes included in the spirit and scope of the present disclosure are included.

Unless otherwise defined, all terms used herein, including technical or scientific terms, have the same meaning as commonly understood by one of ordinary skill in the art to which the present disclosure pertains. Terms such as those defined in a commonly used dictionary should be interpreted as having a meaning consistent with the meaning of the related technology, and should not be interpreted as an ideal or excessively formal meaning unless explicitly defined in the present specification.

When a component, device, element, or the like of the present disclosure is described as having a purpose or performing an operation, function, or the like, the component, device, or element should be considered herein as being "configured to" meet that purpose or to perform that operation or function.

Hereinafter, the present disclosure is described in detail by describing some embodiments with reference to the accompanying drawings. The same reference numerals shown in each drawing indicate the same members.

Figure 1:
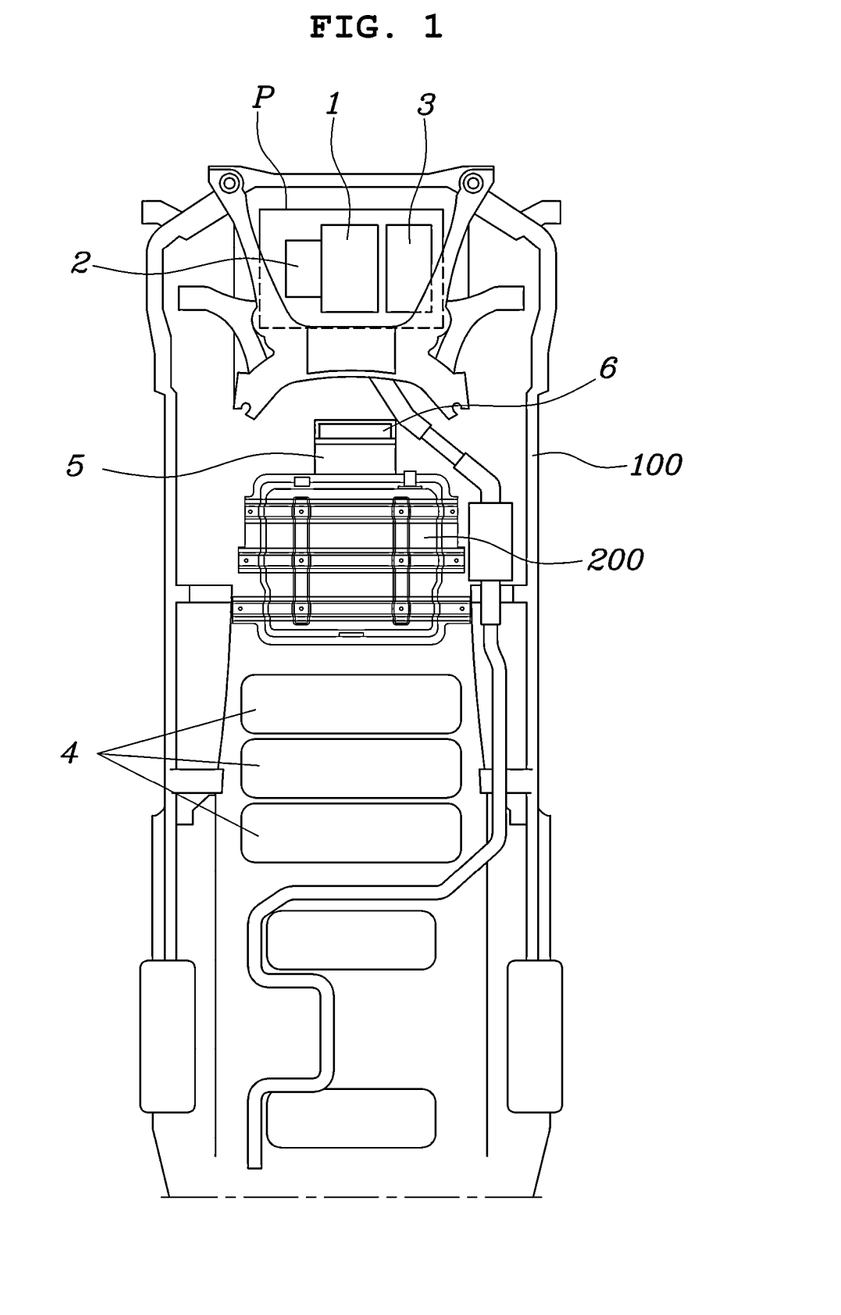
FIG. 1 is a view illustrating an electric mobility vehicle according to one embodiment of the present disclosure.
Figure 2:
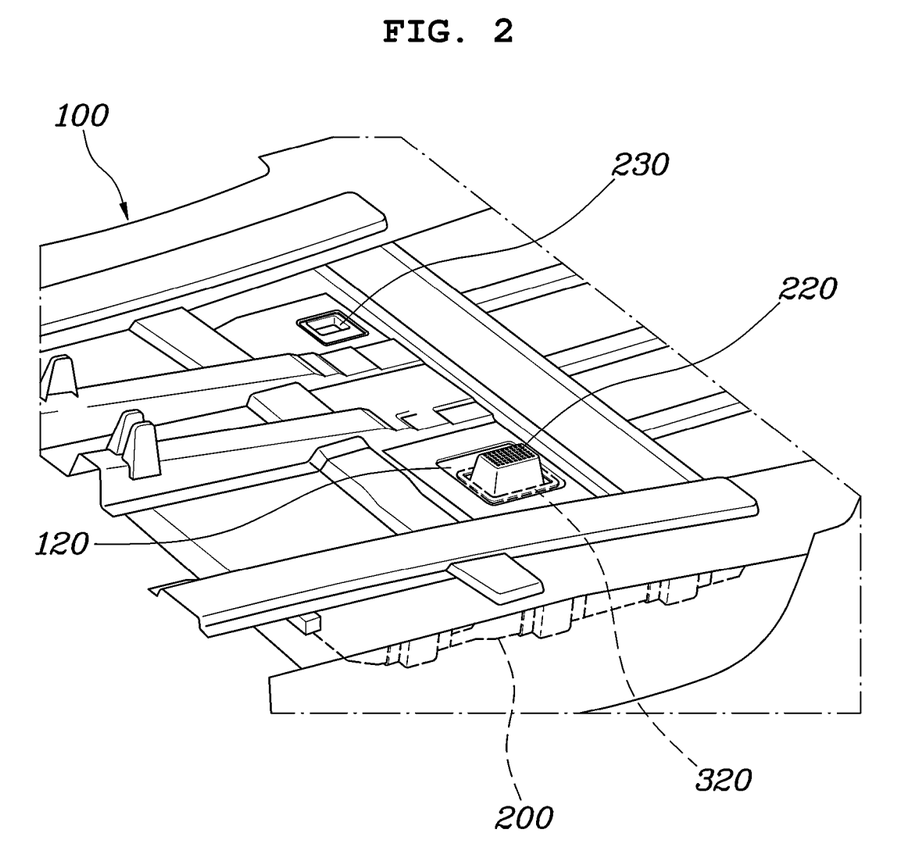
FIG. 2 is a view illustrating a vehicle body floor and a battery assembly of the electric mobility vehicle illustrated in FIG. 1.
Figure 3:
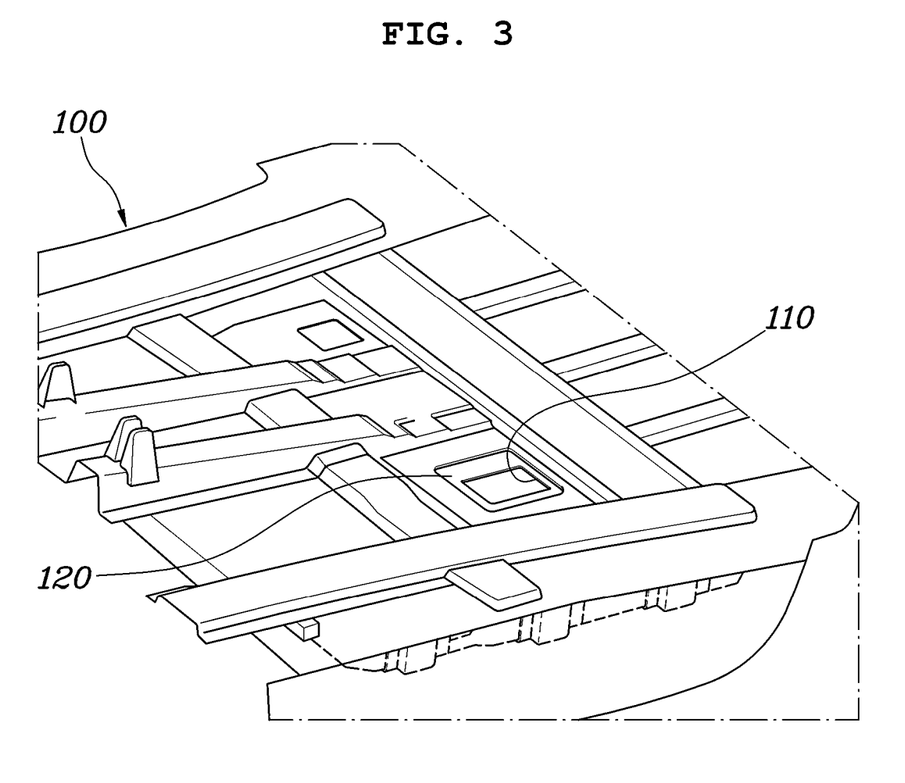
FIG. 3 is a view illustrating the vehicle body floor of the electric mobility vehicle illustrated in FIG. 1.
Figure 4:
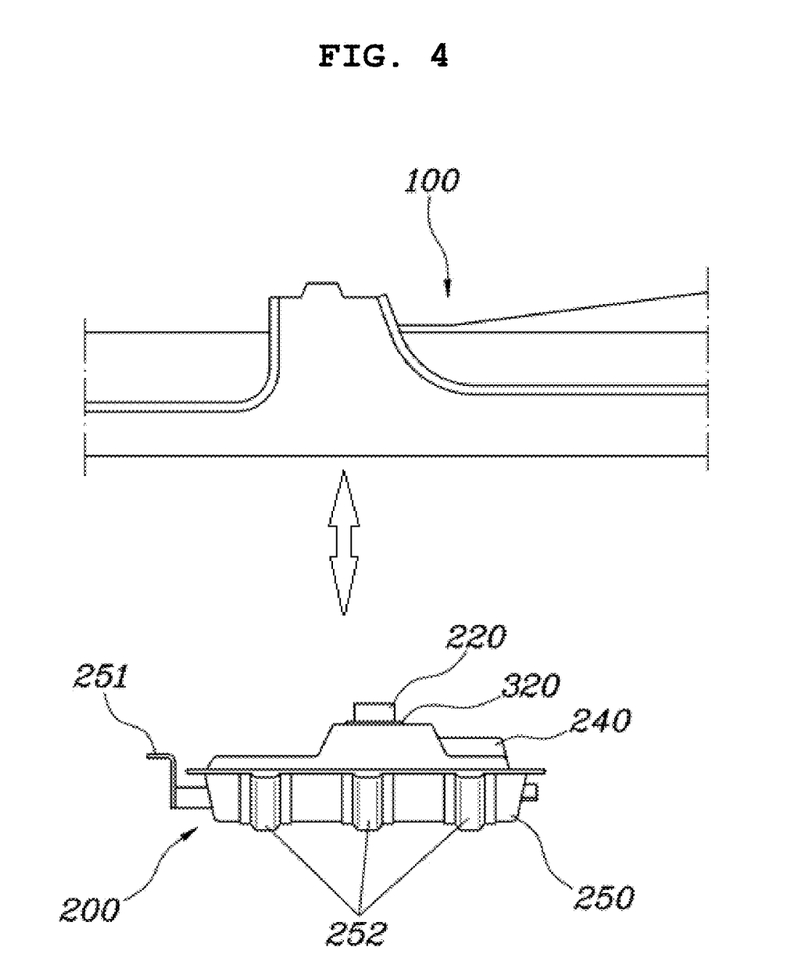
FIG. 4 is a view illustrating an assembly of the vehicle body floor and the battery assembly of the electric mobility vehicle illustrated FIG. 1.
Figure 5:
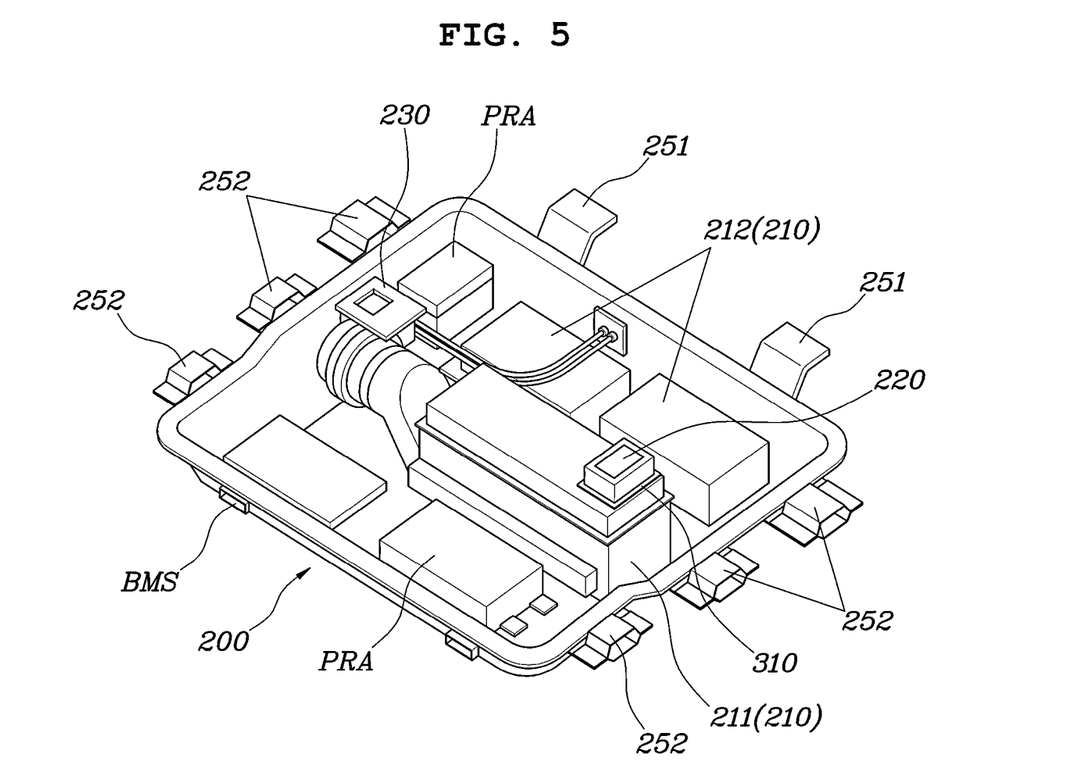
FIG. 5 is a view illustrating an inner portion of the battery assembly according to one embodiment of the present disclosure.
Figure 6:
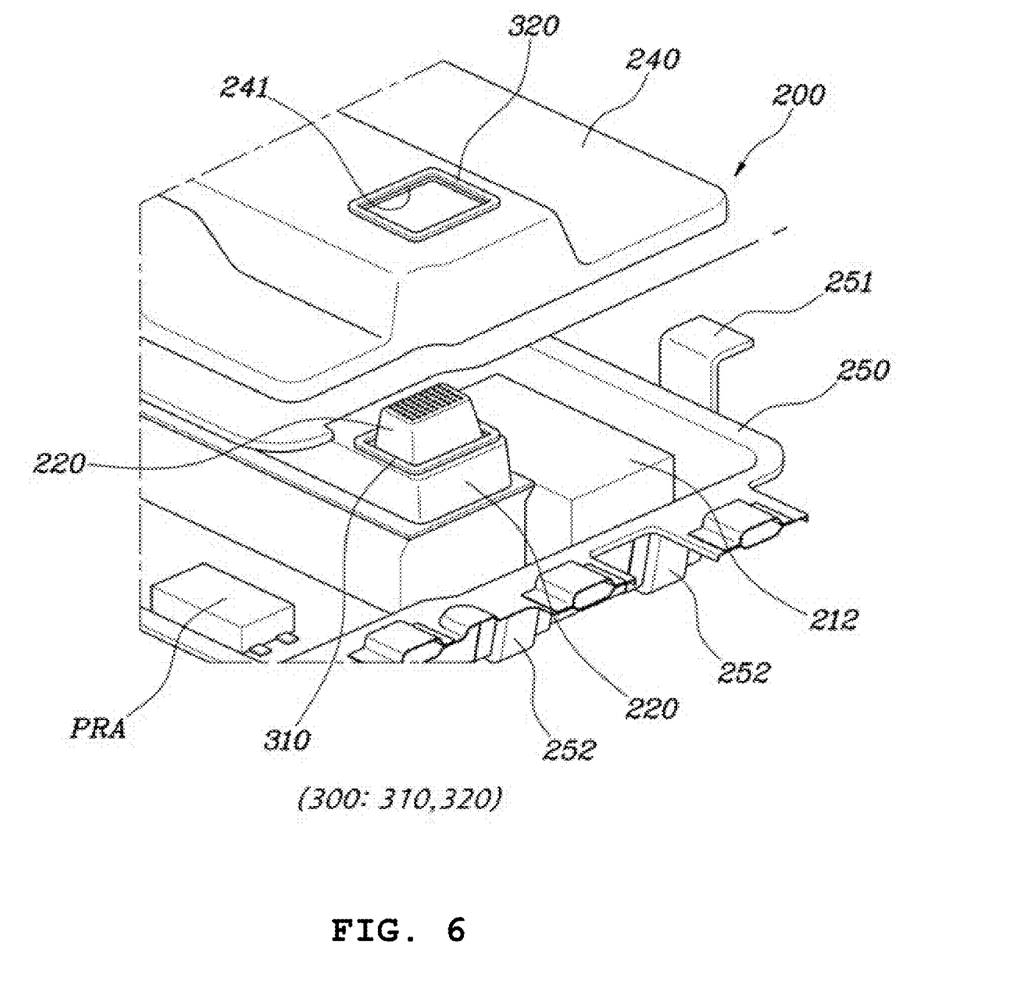
FIG. 6 is a view illustrating an upper casing and a lower casing of the battery assembly according to one embodiment of the present disclosure.
Figure 7:
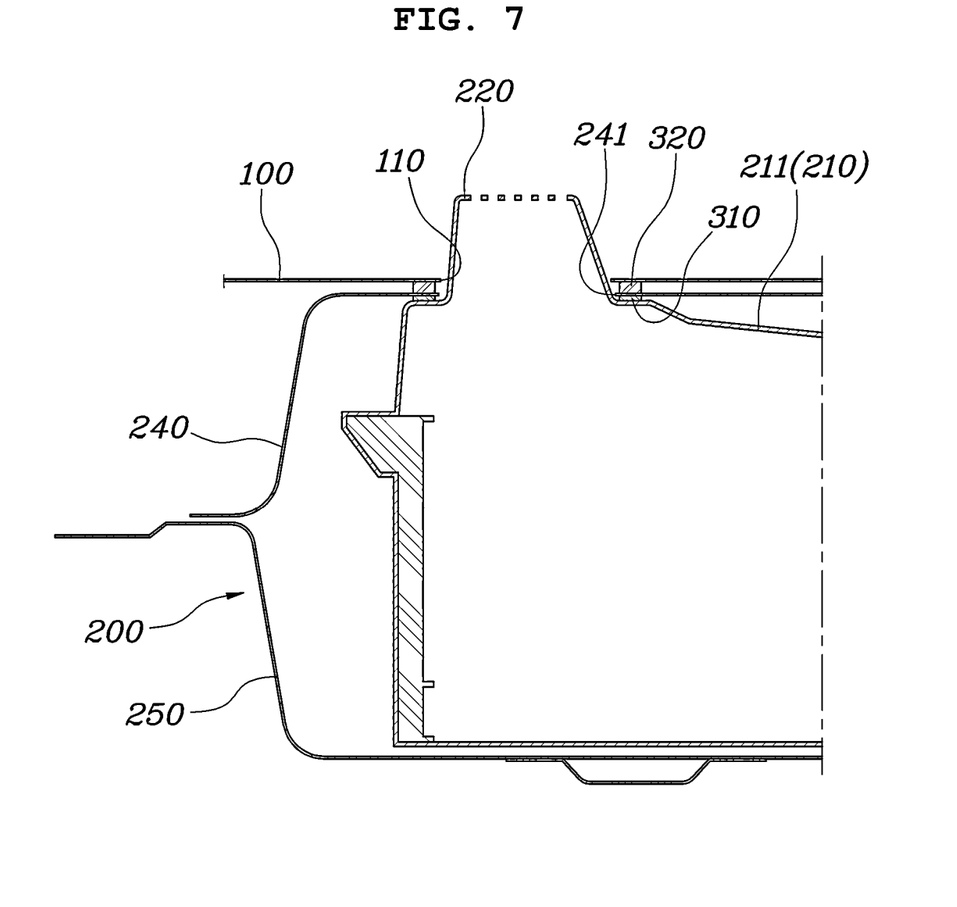
FIG. 7 is a side cross-sectional view illustrating the battery assembly in one embodiment of the present disclosure.
Figure 8:
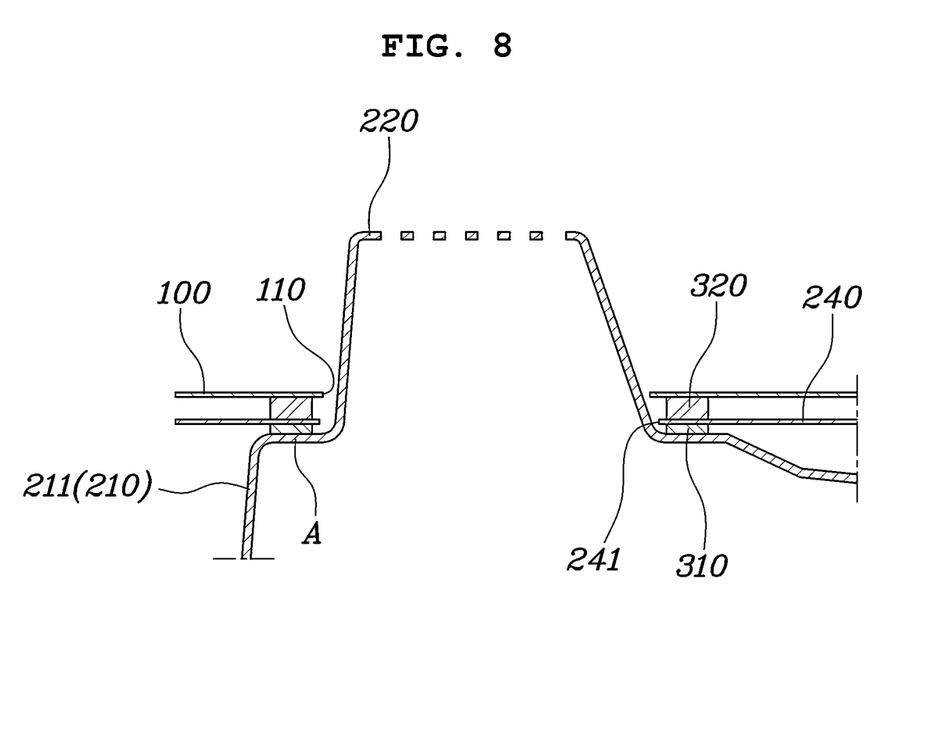
FIG. 8 is a view illustrating a connection structure of an inlet duct according to one embodiment of the present disclosure.
Figure 9:
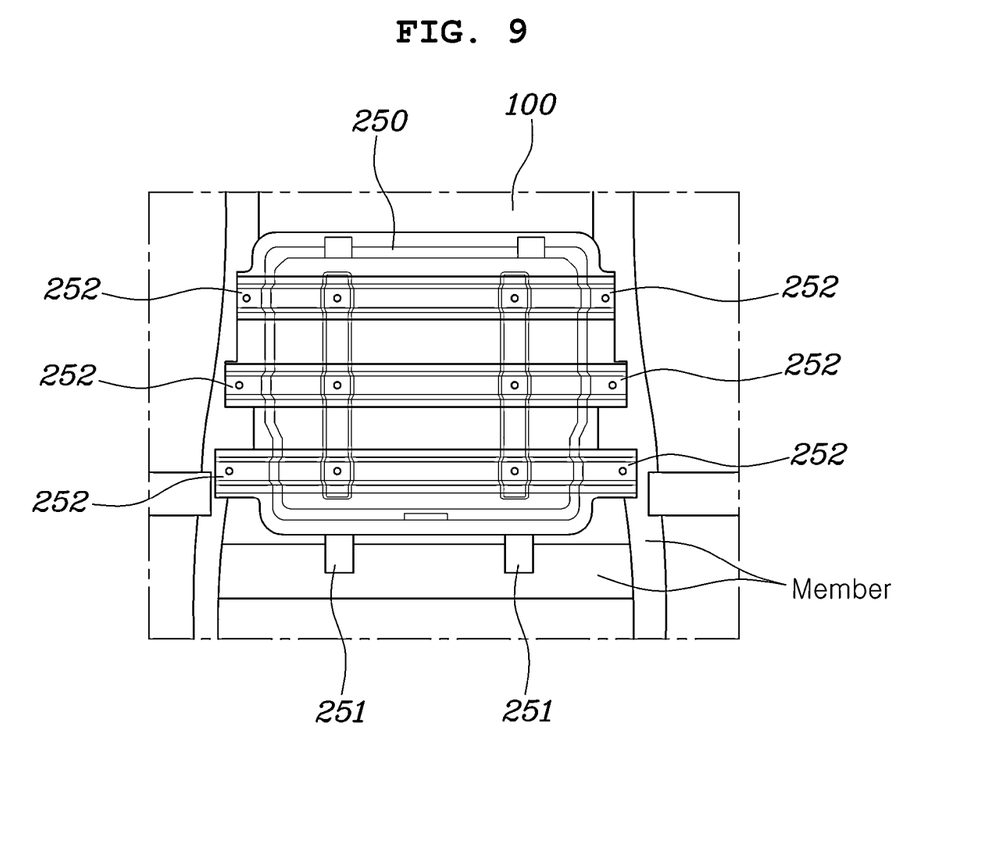
FIG. 9 is a view illustrating a state in which the battery assembly is mounted at the vehicle body floor in one embodiment of the present disclosure.
Figure 10:
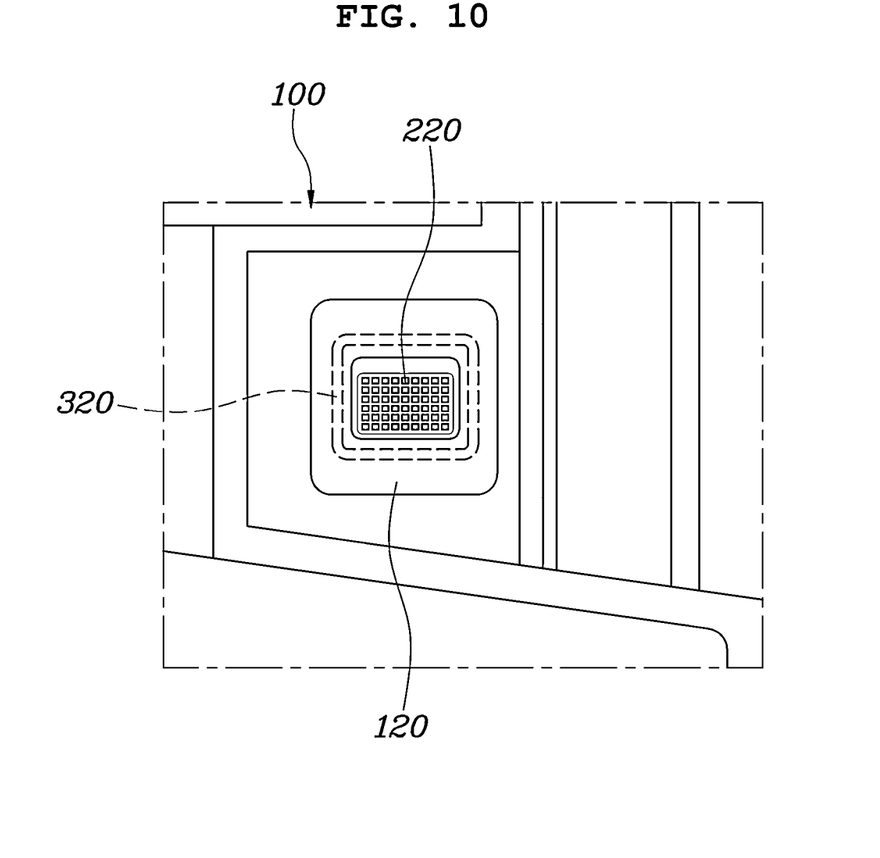
FIG. 10 is a view illustrating a connection of the inlet duct on the vehicle body floor in one embodiment of the present disclosure.

FIG. 1 is a view illustrating an electric mobility vehicle according to one embodiment of the present disclosure. FIG. 2 is a view illustrating a vehicle body floor and a battery assembly of the electric mobility vehicle illustrated in FIG. 1. FIG. 3 is a view illustrating the vehicle body floor of the electric mobility vehicle illustrated in FIG. 1. FIG. 4 is a view illustrating an assembly of the vehicle body floor and the battery assembly of the electric mobility vehicle illustrated FIG. 1. FIG. 5 is a view illustrating an inner portion of the battery assembly according to one embodiment of the present disclosure. FIG. 6 is a view illustrating an upper casing and a lower casing of the battery assembly according to another embodiment of the present disclosure. FIG. 7 is a side cross-sectional view illustrating the battery assembly. FIG. 8 is a view illustrating a connection structure of an inlet duct according to one embodiment of the present disclosure. FIG. 9 is a view illustrating a state in which the battery assembly is mounted at the vehicle body floor. FIG. 10 is a view illustrating a connection of the inlet duct on the vehicle body floor.

As illustrated in FIGS. 1 to 4, the electric mobility vehicle includes: a vehicle body floor 100 in which an opening hole 110 is formed in a vertical direction; and a battery assembly 200 in which a battery module 210 is mounted. In particular, the battery assembly 200 is provided with an inlet duct 220 in which air is intaken and an outlet duct 230 from which air is discharged, and the battery assembly is configured such that the inlet duct 220 is positioned at an upper portion of the vehicle body floor 100 by passing through the opening hole 110 when the battery assembly 200 is mounted on a lower side of the vehicle body floor 100.

In one embodiment of the present disclosure, the battery assembly 200 is provided with the inlet duct 220 and the outlet duct 230 that are for cooling the battery module 210, and the inlet duct 220 for intaking air inside of the mobility vehicle is integrated with the battery module 210. Further, when the battery assembly 200 is mounted on the lower side of the vehicle body floor 100, the inlet duct 220 is inserted into the opening hole 110 of the vehicle body floor 100, so that the inlet duct 220 is positioned at the upper portion of the vehicle body floor 100.

In addition, in the battery assembly 200, a sealing body 300 is provided along a periphery of the inlet duct 220. Further, when the battery assembly 200 is coupled to the lower side of the vehicle body floor 100, the sealing body 300 is pressed by a lower surface of the vehicle body floor 100 and the battery assembly 200 is sealed.

In one embodiment, the sealing body 300 may be formed of an ethylene propylene diene monomer (EPDM) pad, and the sealing body 300 extends along the periphery of the inlet duct 220. Therefore, when the battery assembly 200 is coupled to the lower side of the vehicle body floor 100, the inlet duct 220 is inserted into the opening hole 110 of the vehicle body floor 100. The sealing body 300 provided at the periphery of the inlet duct 220 is in contact with the vehicle body floor 100, so that moisture from outside is not introduced into the battery module 210, thereby preventing damage to the battery module 210.

In one embodiment of the present disclosure, a motor 1 configured to directly generate a driving force of the mobility vehicle, a fuel cell stack 2 configured to generate electricity that drives the motor 1, and an integrated controller 3 configured to control the motor 1 and so on are disposed inside of a PE room P that is positioned in the front of the mobility vehicle. Further, on the lower side of the mobility vehicle, the battery assembly 200 and hydrogen tanks 4 are sequentially disposed rearward of the PE room P. Furthermore, an Integrated DC-DC Converter (IDC) 5 electrically connecting the fuel cell stack 2 to a high voltage battery 211 that configures the battery module 210 mounted in the battery assembly 200 is disposed between the PE room P and the high voltage battery 211.

With this arrangement, a space inside a vehicle and a trunk space do not have to be reduced when the battery assembly 200 and the hydrogen tanks 4 are mounted in the vehicle, and thus a commercial value of the vehicle may be increased.

In addition, by disposing the IDC 5 between the PE room P and the battery assembly 200, a high voltage cable positioned between the high voltage battery 211 and both the fuel cell stack 2 and the motor 1 can be rectilinearly connected without being twisted or severely bent, so that manufacturing cost and weight of the vehicle may be reduced since a length of the high voltage cable is relatively short.

In one embodiment, the IDC 5 is configured such that a Bidirectional High-voltage DC-DC Converter (BHDC) and a Low-voltage DC-DC Converter (LDC) are integrated with each other. Further, the BHDC serves to convert electricity between the fuel cell stack 2 and the high voltage battery 211, and the LDC serves to convert electricity such that a low voltage battery 212 can be charged with electricity of the high voltage battery 211.

In another embodiment, in addition to the IDC 5, a Vehicle to Load (V2L) 6 that enables electricity of the high voltage battery 211 to be used according to a user's convenience may be mounted between the PE room P and the battery assembly 200, and the V2L 6 may be integrated with the IDC 5.

In one embodiment, the battery module 210 is mounted in the battery assembly 200, and the battery assembly 200 is coupled to the lower portion of the vehicle body floor 100. In addition to the battery module 210, the battery assembly 200 is provided with a blower for cooling various electric components and for circulating air. Therefore, when the blower is operated, air intaken through the inlet duct 220 may be discharged through the outlet duct 230 after cooling the battery module 210.

In detail, as illustrated in FIGS. 5 and 6, the battery module 210 includes the high voltage battery 211 electrically connected to the motor 1 and the fuel cell stack 2, and also includes the low voltage battery 212 configured to supply electricity to the electric components. Further, the inlet duct 220 is mounted on the high voltage battery 211 such that the high voltage battery 211 is cooled by the air flowing through the inlet duct 220.

In other words, the battery module 210 is provided with the high voltage battery 211 and the lower voltage battery 212, and the inlet duct 220 is mounted on the high voltage battery 211 such that air flows to the high voltage battery 211. The inlet duct 220 may be integrally coupled to an outer side of a housing of the high voltage battery 211. Further, as the inlet duct 220 protrudes upward from the battery assembly 200 and is inserted into the opening hole 110 of the vehicle body floor 100, the inlet duct 200 intakes indoor air of the mobility vehicle such that the high voltage battery 211 is cooled.

The inlet duct 220 is positioned below a driver seat in the first row, and is configured to intake air inside the vehicle such that the high voltage battery 211 is cooled. Further, the outlet duct 230 extends toward a direction facing a passenger seat in the first row, and may be mounted such that air is directly discharged to the lower side of the vehicle body.

In one embodiment, as illustrated in FIGS. 6 and 7, the battery assembly 200 includes an upper casing 240 and a lower casing 250, the battery module 210 is mounted inside the upper casing 240 and the lower casing 250, and a through-hole 241 is formed in the upper casing 240 such that the inlet duct 220 penetrates through the through-hole 241 and the inlet duct 220 is exposed to the outside.

Because the upper casing 240 and the lower casing 250 are separately configured, various electric components including the battery module 210 can be easily mounted inside the upper casing 240 and the lower casing 250. Further, because a sealed structure is realized by coupling the upper casing 240 to the lower casing 250 and a watertight structure to accommodate the high voltage battery 211 and the low voltage battery 212 that configures the battery module 210.

Particularly, in a position where the inlet duct 220 coupled to the high voltage battery 211 faces the upper casing 240 when the upper casing 240 is coupled to the lower casing 250, the through-hole 241 is formed, so that the inlet duct 220 protrudes upward through the through-hole 241. Therefore, when the battery assembly 200 is mounted at the vehicle body floor 100, the inlet duct 220 exposed through the through-hole 241 of the upper casing 240 may be positioned inside the mobility vehicle through the opening hole 110 of the vehicle body floor 100.

Meanwhile, a first sealing body 310 is provided along the periphery of the inlet duct 220, so that the first sealing body 310 is pressed by the upper casing 240 when the upper casing 240 and the lower casing 250 are coupled together.

Therefore, when the upper casing 240 and the lower casing 250 are coupled together, a space between the upper casing 240 and both the battery module 210 and the inlet duct 220 that are provided inside the lower casing 250 is sealed by the first sealing body 310. In other words, since the battery module 210 including the high voltage battery 211 and the low voltage battery 212 is mounted inside the lower casing 250 and the upper casing 240 is coupled to the lower casing 250, the battery module 210 is positioned inside the upper casing 240 and the lower casing 250. Here, the through-hole 241 is formed in the upper casing 240 so that the inlet duct 220 penetrates through the through-hole 241 and is exposed to the outside, and the inlet duct 220 mounted on the high voltage battery 211 of the battery module 210 is positioned to be matched to the through-hole 241.

In addition, the inlet duct 220 is coupled to the upper surface of the high voltage battery 211. Further, a step A is formed on the periphery of the inlet duct 220, so that the first sealing body 310 is provided on the step A. Therefore, since the step A is formed on the upper surface of the high voltage battery 211 such that the first sealing body 310 is placed on the step A, the first sealing body 310 may be disposed such that the first sealing body 310 surrounds the inlet duct 220 while the first sealing body 310 is placed on the step A. Such a step A is formed on an outer surface of the high voltage battery 211, and the step A may be formed such that the first sealing body 310 deformed by being pressed by the upper casing 240 is accommodated on the step A.

Therefore, when the upper casing 240 and the lower casing 250 are coupled together, the inlet duct 220 is inserted into the through-hole 241 and the inlet duct 220 protrudes to the upper portion of the upper casing 240. The first sealing body 310 provided at the periphery of the inlet duct 220 is pressed by being in contact with an inner surface of the upper casing 240, so that a space between the upper casing 240 and the inlet duct 220 is sealed by the first sealing body 310. In addition, considering a gap between the upper casing 240 and the inlet duct 220 set by a mutual assembly relationship when the upper casing 240 and the lower casing 250 are coupled together, the first sealing body 310 may be configured such that a thickness of the first sealing body 310 is set to have a 50% of compression ratio so as to secure desired sealing performance.

In addition, on the upper casing 240, a second sealing body 320 is provided along a periphery of the through-hole 241, so that the second sealing body 320 is pressed by the lower surface of the vehicle body floor 100 when the battery assembly 200 is coupled to the lower side of the vehicle body floor 100.

Therefore, when the battery assembly 200 is coupled to the lower side of the vehicle body floor 100, a space between the upper casing 240 and the vehicle body floor 100 is sealed by the second sealing body 320 provided at the periphery of the through-hole 241 of the upper casing 240. When the battery assembly 200 is coupled to the vehicle body floor 100, the upper casing 240 is positioned at the lower portion of the vehicle body floor 100. Here, the inlet duct 220 is inserted into the through-hole 241 of the upper casing 240 and the opening hole 110 of the vehicle body floor 100 and protrudes to the upper portion of the vehicle body floor 100. The second sealing body 320 is interposed between the upper casing 240 and the vehicle body floor 100 and is pressed. In addition, considering a gap between the upper casing 240 and the vehicle body floor 100 set by a mutual assembly relationship when the battery assembly 200 is coupled to the vehicle body floor 100, the second sealing body 320 may be configured such that a thickness of the second sealing body 320 is set to have a 50% of compression ratio so as to secure desired sealing performance.

The first sealing body 310 and the second sealing body 320 may be configured such that a pressure acting on the first sealing body 310 and a pressure acting on the second sealing body 320 from a space between the upper casing 240 and the vehicle body floor 100 are uniformly formed when the upper casing 240 and the lower casing 250 are coupled together.

Therefore, the first sealing body 310 and the second sealing body 320 are configured such that a surface pressure generated by assembling is uniform, and is configured to secure assembly and airtightness between each of the components. The first sealing body 310 and the second sealing body 320 may be formed in the same shape. Further, the first sealing body 310 and the second sealing body 320 may be formed in the different shapes according to the pressure acting on the first sealing body 310 and the pressure acting on the second sealing body 320 from the space between the upper casing 240 and the vehicle body floor 100 when the upper casing 240 and the lower casing 250 are coupled together.

In one embodiment, the center of the first sealing body 310 and the center of the second sealing body 320 may be disposed on the same line in the vertical direction. If the first sealing body 310 and the second sealing body 320 are disposed such that the center of the first sealing body 310 and the center of the second sealing body 320 do not match with each other, it is difficult to uniformly form the surface pressure that is acting on the first sealing body 310 and the second sealing body 320, so that the sealing performance may be lowered. Therefore, when the battery assembly 200 and the vehicle body floor 100 are assembled, the surface pressure acting while the center of the first sealing body 310 and the center of the second sealing body 320 are disposed on the same line is uniformly formed, so that the sealing performance may be optimized.

Conventionally, at least three of pads for preventing entering of foreign substances are required to seal a space between an upper casing and a vehicle body floor and a space between the vehicle body floor and an inlet duct. However, in the present disclosure, foreign substances are prevented from entering by using only the first sealing body 310 positioned between the inlet duct 220 and the upper casing 240 and the second sealing body 320 positioned between the upper casing 240 and the vehicle body floor 100. In addition, in the present disclosure, since there is no separate assembly process for mounting the inlet duct 220, convenience of production is secured.

Meanwhile, a plurality of coupling brackets 251 is provided along a border of the lower casing 250 such that the plurality of coupling brackets 251 is coupled to respective members from the lower side of the vehicle body floor 100.

In addition, a support frame 252 that surrounds the lower casing 250 is provided on the lower casing 250, and the support frame 252 is coupled to the member of the vehicle body floor 100.

In order for the battery assembly 200 to be coupled to the vehicle body floor 100, the plurality of coupling brackets 251 is formed on the lower casing 250, and the support frame 252 for securing coupling rigidity is provided at the lower casing 250.

For an example, as illustrated in FIG. 9, on the front and the rear of the lower casing 250, two coupling brackets 251 may be coupled to the members provided at the vehicle body floor 100. Further, on the side of the lower casing 250, three support frames 252 is coupled to the members provided at a vehicle body frame, so that the battery assembly 200 may be firmly fixed to the vehicle body floor 100. Therefore, due to two-point fixing by the coupling brackets 251 and due to six-point fixing by the support frames 252, the battery assembly 200 may be firmly fixed to the vehicle body floor 100 by a total of eight-point fixing.

Particularly, since the support frames 252 extend to surround the lower casing 250, supporting rigidity of the lower casing 250 is secured. Further, since the supports frames 252 are fixed along a plurality of positions with respect to the vehicle body floor 100, the battery assembly 200 is firmly fixed to the vehicle body floor 100.

In one embodiment, as illustrated in FIG. 10, the vehicle body floor 100 may be formed such that a peripheral portion 120 of the opening hole 110 forms a plane.

Because the vehicle body floor 100 is formed such that the peripheral portion 120 of the opening hole 110 forms the plane, the second sealing body 320 positioned between the opening hole 110 and the upper casing 240 is in contact with a portion forming the plane, so that the uniform surface pressure may be formed.

In the electric mobility vehicle configured as described above, the material cost is reduced by simplifying the structure for cooling the battery module and a sealing structure, the sealing performance is increased since an inflow path of moisture from the outside is reduced, and the desired battery cooling performance is secured.

Although exemplary embodiments of the present disclosure have been described herein, it is understood that the present disclosure should not be limited to these exemplary embodiments and that various changes and modifications can be made by one ordinary skilled in the art within the spirit and scope of the present disclosure.

What is claimed is:

1. An electric mobility vehicle comprising:
a vehicle body floor in which an opening hole is formed in a vertical direction; and
a battery assembly in which a battery module is mounted, wherein the battery assembly is provided with an inlet duct in which air is intaken and an outlet duct from which the air is discharged,
wherein the inlet duct of the battery assembly is positioned at an upper portion of the vehicle body floor by passing through the opening hole when the battery assembly is mounted on a lower side of the vehicle body floor, and
wherein:
the battery assembly is provided with a first sealing body that is provided along a periphery of the inlet duct, and
the first sealing body is pressed by a lower surface of the vehicle body floor and the battery assembly is sealed when the battery assembly is coupled to the lower side of the vehicle body floor.

2. The electric mobility vehicle of claim 1, wherein:
the battery module comprises a high voltage battery electrically connected to a motor and a fuel cell stack, and a low voltage battery configured to supply electricity to an electric component; and
the inlet duct is mounted on the high voltage battery such that the high voltage battery is cooled by the air that is intaken.

3. The electric mobility vehicle of claim 2, wherein:
the battery assembly comprises an upper casing and a lower casing,
the battery module is mounted inside the upper casing and the lower casing that are coupled together, and
a through-hole is formed in the upper casing such that the inlet duct penetrates through the through-hole and is exposed to an outside.

4. The electric mobility vehicle of claim 3, wherein:
the first sealing body is pressed by the upper casing when the upper casing and the lower casing are coupled together.

5. The electric mobility vehicle of claim 4, wherein:
the inlet duct is coupled to an upper surface of the high voltage battery, and
a step is formed along the periphery of the inlet duct, so that the first sealing body is provided on the step.

6. The electric mobility vehicle of claim 4, wherein:
the upper casing is provided with a second sealing body that is provided along a periphery of the through-hole, and
the second sealing body is pressed by the lower surface of the vehicle body floor when the battery assembly is coupled to the lower side of the vehicle body floor.

7. The electric mobility vehicle of claim 6, wherein the first sealing body and the second sealing body are configured such that a pressure acting on the first sealing body and a pressure acting on the second sealing body from a space between the upper casing and the vehicle body floor are uniformly formed when the upper casing and the lower casing are coupled together.

8. The electric mobility vehicle of claim 3, wherein the lower casing is provided with a plurality of coupling brackets that is provided along a border of the lower casing such that the plurality of coupling brackets is coupled to each member from the lower side of the vehicle body floor.

9. The electric mobility vehicle of claim 8, wherein the lower casing is provided with a support frame that surrounds the lower casing, and the support frame is coupled to the member of the vehicle body floor.

10. The electric mobility vehicle of claim 1, wherein the vehicle body floor is configured such that a peripheral portion of the opening hole forms a plane.

* * * * *